(12) United States Patent
Montalvo-Bartolomei et al.

(10) Patent No.: US 11,745,122 B2
(45) Date of Patent: Sep. 5, 2023

(54) SAND BOIL FILTER WITH ADJUSTABLE HYDRAULIC HEAD

(71) Applicant: United States of America as Represented by The Secretary of The Army, Alexandria, VA (US)

(72) Inventors: Axel M Montalvo-Bartolomei, Vicksburg, MS (US); Bryant A Robbins, Lakewood, CO (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 92 days.

(21) Appl. No.: 17/488,301

(22) Filed: Sep. 29, 2021

(65) Prior Publication Data

US 2023/0097147 A1    Mar. 30, 2023

(51) Int. Cl.
*B01D 29/085*   (2006.01)
*E02D 3/10*   (2006.01)
*B01D 29/15*   (2006.01)

(52) U.S. Cl.
CPC ........... *B01D 29/085* (2013.01); *B01D 29/15* (2013.01); *E02D 3/10* (2013.01); *B01D 2201/02* (2013.01)

(58) Field of Classification Search
CPC .. B01D 29/085; B01D 29/15; B01D 2201/02; E02D 3/10
See application file for complete search history.

(56) References Cited

U.S. PATENT DOCUMENTS

2019/0271129 A1*   9/2019   Stephens ................... E02D 3/00

* cited by examiner

*Primary Examiner* — Waqaas Ali
(74) *Attorney, Agent, or Firm* — Brian C. Jones (57) ABSTRACT

In one embodiment, a sand boil filter apparatus has a filter cone including an inner cone mesh and an outer cone mesh, the inner cone mesh having a finer mesh than the outer cone mesh. A filter tube extends through the hollow interior of the filter cone. The filter tube includes a lower portion disposed below the open apex. The filter tube includes an upper portion disposed above the open base. The upper portion has a plurality of sets of exit openings which are spaced along a length of the upper portion to provide different possible exit heights for the plurality of sets of exit openings, each set including one or more exit openings disposed at an exit height of the filter tube. An exit height adjustment tool blocks all of the exit openings disposed below a set of unblocked exit openings selected to provide a corresponding exit height.

20 Claims, 6 Drawing Sheets

SAND BOIL FILTER WITH ADJUSTABLE HYDRAULIC HEAD

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to apparatus and methods of controlling sand boils.

Description of the Related Art

This section introduces aspects that may help facilitate a better understanding of the invention. Accordingly, the statements of this section are to be read in this light and are not to be understood as admissions about what is prior art or what is not prior art.

A sand boil is an eruption of a liquefaction of sediment (e.g., sand) and water through a bed of sediment due, for instance, to differences in water pressure on two sides of a levee (or other water-retaining structure such as a dam) which causes liquefied sediment and water to flow from beneath the levee and out of a sand boil on the land side of the levee. If left unchecked, a sand boil can continue to grow in size, thereby decreasing the effectiveness of the levee in preventing water from reaching the land side. Moreover, an unchecked sand boil can result in internal erosion of the foundation soils underneath the levee that can create one or more channels or pipes beneath the levee embankment. The creation of channels and pipes can quickly pick up pace and eventually result in failure of the levee.

Once sand boils form, they enlarge as erosion progresses. Therefore, sand boils can be the manifestation of internal erosion, specifically backward erosion piping (BEP). BEP may lead to a possible breach of the structure. The eroded material from the foundation is transported through the pipe that forms and up the throat of the sand boil. Due to the many failures of structures attributed to BEP, it is very important to control sand boils from enlarging. During flood events, emergency operations are conducted to minimize the risk of breaches and protect lives and property. These operations are also known as "flood fighting." Although most sand boils will not lead to breach of an embankment, it is important to ensure that active sand boils do not grow uncontrollably. Decreasing the average horizontal gradient across the structure is important during flooding events to prevent or at least slow down the active erosion. Increasing the head loss at the exit contributes to reducing the head loss in the horizontal pipe.

To control active sand boils, the most common technique is to elevate the water level at the seepage exit above the sand boil by creating a body of water. By forming the body of water, the additional hydraulic pressure will potentially slow down the flow and decrease the head difference or horizontal hydraulic gradient. The reduction of the gradient is essential to slow down or stop altogether the progression of BEP. A common technique for controlling an exposed sand boil in the field usually involves constructing a ring of sandbags around the boil to elevate the hydraulic head at the seepage exit, thereby decreasing the hydraulic gradient and rate of erosion. Building up the head of water at the sand boil exit is necessary when the discharge from the boil continues to carry material to the surface. A sand boil is controlled when water flows to the surface without carrying eroded material. This means that the erosion process has stopped and the sandbag ring has been effective. It is worth noting, however, that raising the water level too high when using either technique can potentially lead to other sand boils forming or blowouts.

SUMMARY

The present invention was developed to address the desire for an effective tool to control sand boils in, for instance, flood fighting. Research and development have led to a novel sand boil filter apparatus that enables the operator to adjust the hydraulic head of the seepage exit easily and quickly in real time so as to control sand boils more effectively. The apparatus may be lightweight. In specific embodiments, one operator can install the sand boil filter apparatus and adjust the hydraulic head without assistance.

Embodiments of the present invention provide a sand boil filter apparatus having a filter cone including an outer cone mesh and an inner cone mesh which is finer than the outer cone mesh. A filter tube extends through the hollow interior of the filter cone. The filter tube includes a lower portion disposed below the open apex and an upper portion disposed above the open base. The upper portion has a plurality of sets of exit openings which are spaced along a length of the upper portion to provide different possible exit heights for the plurality of sets of exit openings, each set including one or more exit openings disposed at an exit height of the filter tube. An exit height adjustment tool blocks all of the exit openings disposed below a set of unblocked exit openings selected to provide a corresponding exit height.

This tool can be deployed during flood response efforts to control active sand boils and prevent further progression of erosion. One person can install one of these filters in a sand boil with the required materials during flood fighting events in case that there are no sandbags readily available. If used correctly, the sand boil filter can increase the head at the seepage exit of an active sand boil. The additional head that it can provide has been proven through laboratory experiments to be equivalent to the use of sandbags.

According to an aspect the present invention, a sand boil filter apparatus comprises a filter cone including an inner cone mesh and an outer cone mesh, the inner cone mesh having a finer mesh than the outer cone mesh. The filter cone has a hollow interior with an open apex oriented downwardly and an open base disposed above the open apex. A filter tube extends through the hollow interior of the filter cone. The filter tube includes a lower portion disposed below the open apex of the filter cone. The filter tube includes an upper portion disposed above the open base of the filter cone. The upper portion has a plurality of sets of exit openings which are spaced along a length of the upper portion to provide different possible exit heights for the plurality of sets of exit openings, each set including one or more exit openings disposed at an exit height of the filter tube. Weights are disposed inside the hollow interior of the filter cone and surround a portion of the filter tube disposed inside the hollow interior of the filter cone. An exit height adjustment tool is used to block all of the exit openings disposed below a set of unblocked exit openings selected to provide a corresponding exit height.

In some embodiments, the inner cone mesh has an average hole size of 0.003 inches (0.076 millimeters) in diameter. The mesh openings in the outer cone mesh may be two times larger to an order of magnitude larger than mesh openings in the inner cone mesh. The exit height adjustment tool may comprise a no-hub coupling for sealing each set of the exit openings disposed below the set of unblocked exit openings selected to provide the corresponding exit heights. The filter tube may include a plurality of ports in the lower portion to permit entry of water and particles into the filter tube. A flexible tube may be connected to a lower end of the lower portion of the filter tube. The flexible tube has a plurality of openings to permit entry of water and particles into the flexible tube.

In specific embodiments, an attachment member is used to attach the filter cone and the filter tube at the open apex of the filter cone. A compacting tool is coupled to the filter tube and disposed in the hollow interior of the filter cone above the weights.

According to another aspect, a sand boil filter apparatus for controlling a sand boil comprises a filter cone having a hollow interior with an open apex oriented downwardly and an open base disposed above the open apex, the filter cone including a mechanism for letting water through and blocking particles from passing therethrough. A filter tube extends through the hollow interior of the filter cone. The filter tube includes a lower portion disposed below the open apex of the filter cone. The filter tube includes an upper portion disposed above the open base of the filter cone. The upper portion has a plurality of sets of exit openings which are spaced along a length of the upper portion to provide different possible exit heights for the plurality of sets of exit openings, each set including one or more exit openings disposed at an exit height of the filter tube. A permeable granular material is disposed inside the hollow interior of the filter cone and surrounds a portion of the filter tube disposed inside the hollow interior of the filter cone. The apparatus further includes a mechanism for blocking all of the exit openings disposed below a set of unblocked exit openings selected to provide a corresponding exit height.

In some embodiments, the apparatus further comprises a mechanism for attaching the filter cone and the filter tube at the open apex of the filter cone. The apparatus may further comprise means for compacting the permeable granular material inside the hollow interior of the filter cone.

According to yet another aspect, a method of controlling a sand boil having a sand boil throat comprises: positioning a filter cone having a hollow interior with an open apex oriented downwardly and an open base disposed above the open apex, the filter cone including an inner cone mesh and an outer cone mesh, the inner cone mesh having a finer mesh than the outer cone mesh to let water through and block particles from passing therethrough; inserting a filter tube through the hollow interior of the filter cone, the filter tube including a lower portion disposed below the open apex of the filter cone, the filter tube including an upper portion disposed above the open base of the filter cone, the upper portion having a plurality of sets of exit openings which are spaced along a length of the upper portion to provide different possible exit heights for the plurality of sets of exit openings, each set including one or more exit openings disposed at an exit height of the filter tube; placing a permeable granular material inside the hollow interior of the filter cone to surround a portion of the filter tube disposed inside the hollow interior of the filter cone; and blocking all of the exit openings disposed below a lowest set of unblocked exit openings selected to provide a corresponding exit height.

In specific embodiments, the method further comprises inserting the lower portion of the filter tube into the sand boil throat and inserting the filter cone partially into the sand boil throat; and compacting the permeable granular material inside the hollow interior of the filter cone.

In some embodiments, the method further comprises measuring an exit height of the lowest set of unblocked exit openings; and if the exit height is not at a target exit height, performing at least one of unblocking one or more sets of the exit openings or blocking one or more sets of the exit openings, to provide a different lowest set of unblocked exit openings corresponding to the target exit height. The method may further comprise compacting the permeable granular material inside the hollow interior of the filter cone after performing the at least one of unblocking one or more sets of the exit openings or blocking one or more sets of the exit openings, to provide the different lowest set of unblocked exit openings corresponding to the target exit height.

In specific embodiments, the initial target exit height is approximately 1.5 to 2 feet measured from a water level on the sand boil to the lowest set of unblocked exit openings. This exit height difference is additional head acting on the sand boil and can be adjusted to control a sand boil.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Sand Boil Filter Apparatus

Figure 1:
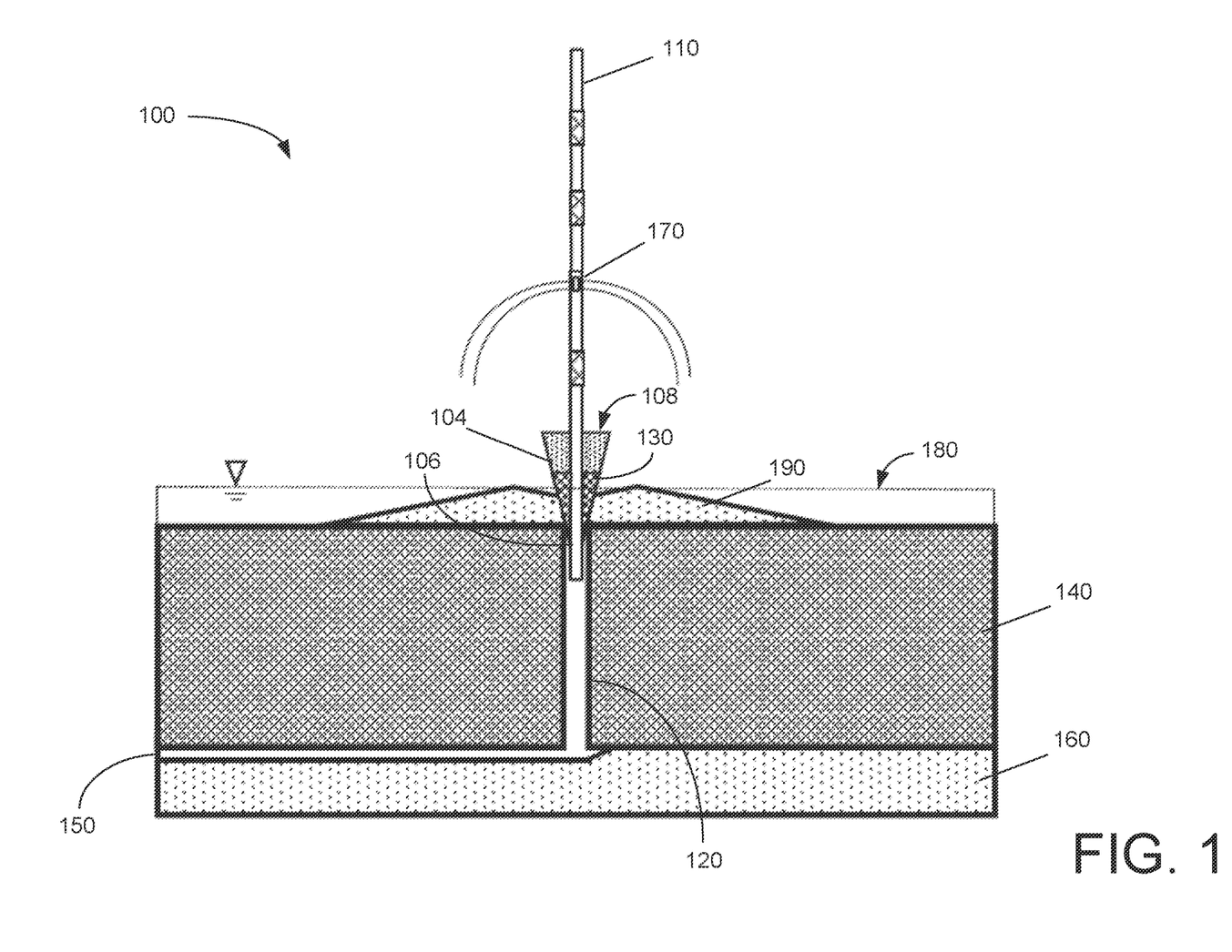
FIG. 1 is a front elevational view schematically illustrating a sand boil filter apparatus partially inserted into a throat of a sand boil according to an embodiment of the present invention.

FIG. 1 is a front elevational view schematically illustrating a sand boil filter apparatus partially inserted into a throat of a sand boil according to an embodiment of the present invention. The sand boil filter apparatus 100 includes a cone-shaped filter member or a filter cone 104 with a filter tube 110 passing through an apex (or vertex) 106 of the filter cone 104. The filter apparatus 100 is installed by pushing it into the sand boil throat 120 with the apex 106 of the filter cone 104 at the bottom pointing downwardly into the throat 120 and the open base 108 at the top. A permeable granular material such as gravel 130 or the like is placed in the filter cone 104 through the open base 108 at the top to add weight and provide friction against the sand boil throat 120. In this example, the sand boil throat 120 extends through top stratum (clay) 140 to a pipe 150 formed by BEP in the foundation material 160 below such as sand. Deposited material 190 is foundation material carried through the pipe and throat and forms the volcano shape of the sand boil at the surface on top of the clay 140. The foundation material and water passing through the throat 120 enter the sand boil filter apparatus via the bottom end of the filter tube 110 to one or more seepage exit openings 170 at an exit height above the water level 180.

The filter cone 104 includes openings to filter particles and the like. It may be formed using mesh sheeting made of polymer, metal, or the like. The mesh holes are sufficiently small to block any particles from passing through them and only let water through. The filter cone 104 may include multiple mesh sheets to form a multi-layer cone. In one example, two mesh sheets having different opening sizes and material properties are used to form the filter cone 104.

The filter tube 110 may be a clear acrylic tube. It passes through the apex 106 of the filter cone 104 into the sand boil throat 120 to force the sand/particles and water from the sand boil throat to come out through the filter tube 110. The filter tube 110 has multiple openings or holes drilled or otherwise formed at different heights to provide seepage exits at different heights. The filter tube 110 provides additional head at the tailwater of the sand boil filter apparatus 100 when sand and water has to rise through it from the bottom to the height of the first (lowest) row or group of holes open to the atmosphere. This height of the open holes dictates the hydraulic pressure allowed to form under the filter cone 104. The use of the lightweight filter apparatus can result in an excess head at the seepage exit comparable to the head that sandbags can add when they make the body of water on sand boils.

Figure 2:
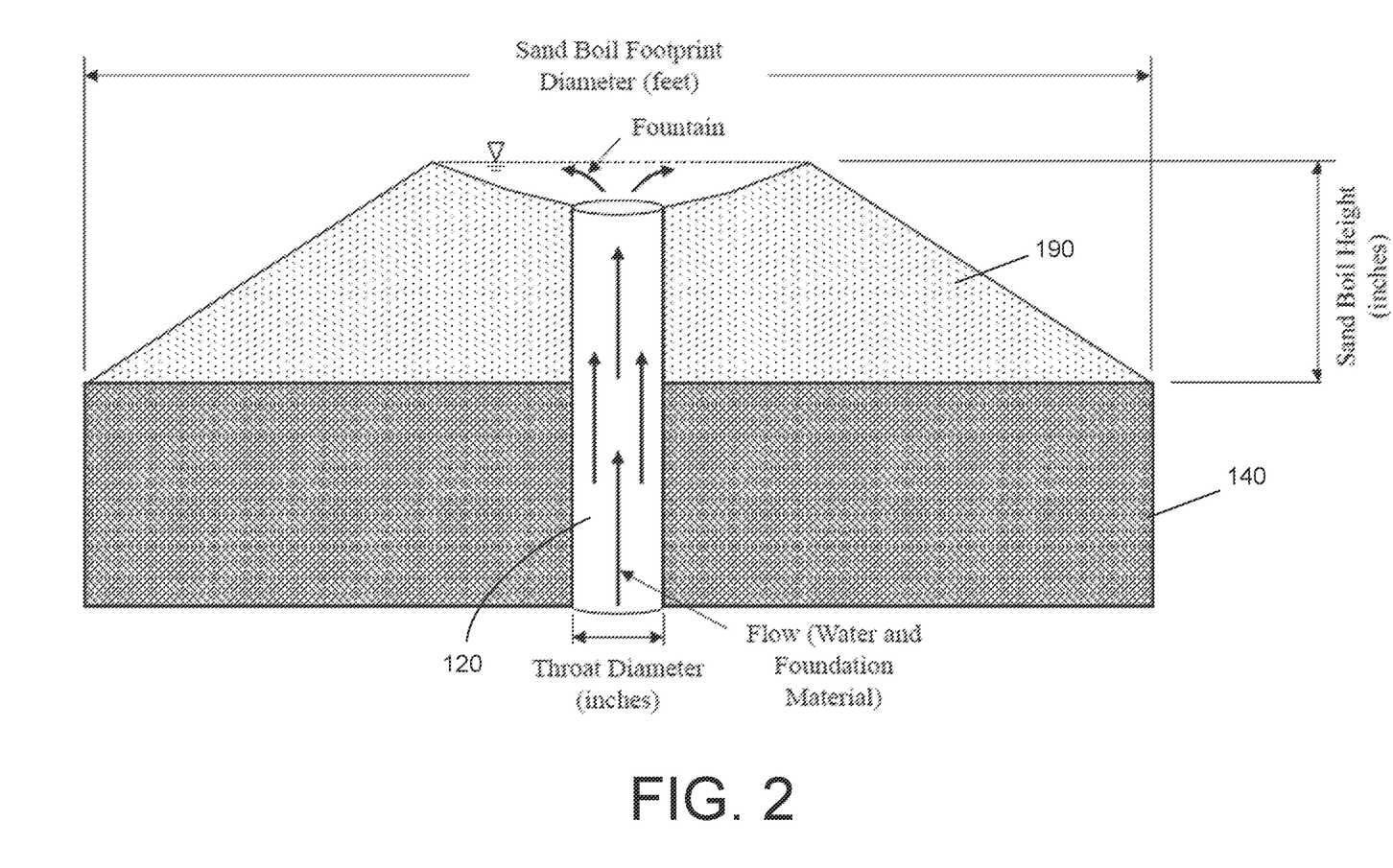
FIG. 2 is a sectional view illustrating a sand boil geometry.

FIG. 2 is a sectional view illustrating a sand boil geometry. The sand boil has a foundation material with a sand boil footprint represented by a diameter and a sand boil height. A flow of water and foundation material (e.g., sand) moves upward through the sand boil throat. One sand boil characteristic is the sand boil size of the fountain. A pin boil has a throat size less than ½-inch in diameter (less than 1 finger width wide). A small boil has a throat size between ½-inch to 2-inches in diameter (up to 3 finger widths). A medium boil has a throat size between 2-inch to 4-inches in diameter (3 fingers to a fist). A large boil has a throat size between 4-inch to 6-inches in diameter (a fist and an extended thumb). A very large boil has a throat size greater than 6-inches in diameter (larger than a fist and an extended thumb). Another sand boil characteristic is the sand boil activity. Low activity means very little to no sand observed around the throat of the sand boil and seepage discharge is clear. For moderate activity, the sand accumulated around the sand boil is less than 6 cubic feet (6 cubic feet is roughly equivalent to one wheelbarrow full of material) or the seepage discharge is slightly cloudy. For high activity, the filter cone of sand accumulated around the sand boil is greater than 6 cubic feet of material but less than 1 cubic yard, or the seepage discharge is very cloudy. For very high activity, greater than one cubic yard (27 cubic feet) of material is accumulated around the sand boil (one cubic yard is roughly equivalent to the outside dimensions of a standard refrigerator/freezer), or the seepage discharge is extremely cloudy. The volcano shape of a sand boil is formed with deposited material 190 on top of the clay 140 around the throat 120.

The sand boil filter apparatus is a tool that can be deployed during flood response efforts to control active sand boils and prevent further progression of erosion for sand boils of various sizes.

Sand Boil Filter Kit

The sand boil filter apparatus 100 may be built using a sand boil filter kit that includes a set of kit components. In specific embodiments, a sand boil kit includes a filter cone, a filter tube with an optional flexible tube, an attachment member between the filter cone and the filter tube, weights, and seepage exit height adjustment tool. The kit may further include additional tools and accessories as discussed below.

Figure 3:
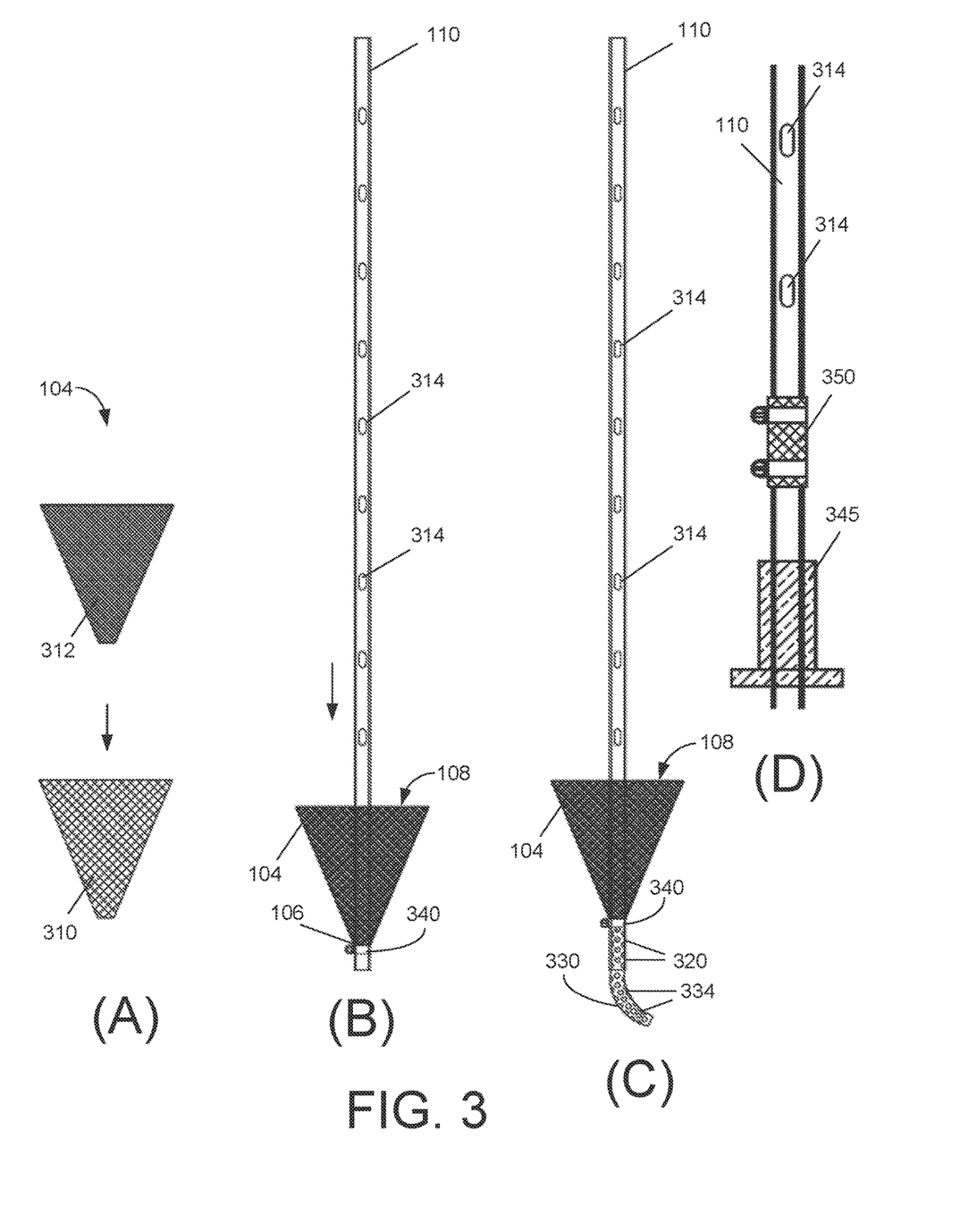
FIG. 3 schematically illustrates components of the sand boil filter apparatus and assembly thereof according to an embodiment including (A) a dual-layer filter cone, (B) a filter tube with the filter cone close to the bottom end, (C) a filter tube with additional holes in the lower section and a flexible tip, and (D) a close-up view of the filter tube showing seepage exit openings at different heights, a bulkhead fitting, and a no-hub coupling for sealing the seepage exit openings at a certain height, resulting in an exposed set of seepage exit slots that allow the discharge of water and sand from the filter tube.

FIG. 3 schematically illustrates components of the sand boil filter apparatus and assembly thereof according to an embodiment including (A) a dual-layer filter cone, (B) a filter tube with the filter cone close to the bottom end, (C) a filter tube with additional holes in the lower section and a flexible tip, and (D) a close-up view of the filter tube showing seepage exit openings at different heights, a bulkhead fitting, and a no-hub coupling for sealing the seepage exit openings at a certain height, resulting in an exposed set of seepage exit slots that allow the discharge of water and sand from the filter tube.

In one embodiment, the filter cone 104 has double-layer filter cones made of two different plastic meshes, as seen in FIG. 3(A). An outer mesh 310 is more rigid than an inner mesh 312 and has larger openings. For example, the openings in the outer mesh 310 may be two to several times larger to an order of magnitude larger than the openings in the inner mesh 312. In a specific embodiment, the size of the openings of the outer mesh 310 is about 0.033 inches (0.838 millimeters) in diameter and the size of the openings of the inner mesh 312 has an average hole size of 0.003 inches (0.076 millimeters) in diameter. As compared to the outer mesh 310, the inner mesh 312 is thinner (hence less rigid and more compliant) and has holes about 10× smaller. The inner filter mesh 312 can allow water through, but will block eroded material or sediments (e.g., sand) coming out from the sand boil throat 120. Particles smaller than 0.075 mm (#200 sieve) could potentially move through the fine inner mesh 312. As discussed below, a permeable granular material such as fine gravel may be added to the filter cone to expand the filter cone and add weight to it.

A variety of meshes may be used to make the filter cones 104. The meshes may be made of any suitable material including, e.g., nylon, polyester, brass, copper, aluminum, and steel. The polymer sheets (nylon and polyester) are relatively flexible and easy to form cones, and may be more effective. The metals sheets (brass, copper, aluminum, and steel) are, in general, relatively more rigid and more difficult to handle. The filter cones constructed out of these materials may have an opening angle of between 18 and 40 degrees, for example. The dimensions of the height and circular base 108 of these cones may vary approximately from 7.1 in. (18 cm) to 18.9 in. (48 cm) and from 6.3 in. (16 cm) to 12 in. (30.5 cm), respectively. In a specific embodiment, the filter cone size height and circular base are 12 in. (30.5 cm) and 12 in. (30.5 cm), respectively. The filter cones made from polymers may be cut and bonded with an adhesive (e.g., AquaSeal™) or a non-permanent sealant, or by staples. In addition, copper wire may be used to sew the filter cones together to form a dual-layer filter cone. Metal cones may be fabricated in a machine shop where the sheets are cut, molded, and soldered.

The vertical filter tube 110 (also referred to as a throat tube or a seepage exit tube) may be approximately 6 feet long from flange to flange. The filter tube column may be a clear acrylic tube that is inserted into the vertical throat of a sand boil and allows to observe the outflow from the sand boil. The filter tube may have an inner diameter of between about 1 inch and 3 inches (2.54 cm and 7.62 cm). The filter tube 110 is inserted through the apex 106 of the filter cone 104 into the sand boil throat, as seen in FIGS. 3(B) and 3(C).

One example is a 1-inch-diameter, schedule 40, 6-feet-long clear PVC tube with holes or slots 314 for seepage exit at different heights, as seen in FIGS. 3(B) and 3(C). The filter tube 110 transports the water and eroded sediments from the sand boil through it. As sediments are blocked from going through the filter cone 104, the water head builds up in the sand boil throat 120 and the level rises in the filter tube 110. Water carrying sediments is forced to come out from the seepage exit holes 314. In this example, there are 4 slots every 6 inches in height, as seen in FIGS. 3(C) and 3(D). Thus, the water level or head can be incremented or decreased every 6 inches. The dimensions of the slots may be 1.25" long by 0.5" wide. The size, shape, number, and spacing of the seepage exit openings or slots 314 may vary in other embodiments. A tape measure may be used to measure the height of the water level inside the filter tube 110 and take any other pertinent measurements.

The filter tube 110 may include a plurality of ports 320 along the lower portion that is inserted into the sand boil throat 120. These holes allow water and sediment to flow into the tube 110 when it is necessary to reach deeper into the sand boil throat 120. The holes can be drilled if it is necessary to insert the lower portion of the filter tube 110 deeper in the sand boil.

An optional flexible tube 330 may be connected to the lower end of the filter tube 110 to form a flexible extension into the sand boil throat 120. The flexible tube 330 includes a plurality of holes 334. The flexible tube 330 can be used to reach deeper into the sand boil throat 120. The flexibility of this tube extension allows it to be used in sand boil throats that bend sharply from the ground surface toward the source of water. The flexible tube 330 has the multiple holes 334 to allow water and sediment therethrough. In one example, the flexible tube 330 is a clear flexible tube with a diameter of 0.75 inches (1.905 cm) and made of a flexible polymer or plastic. It is connected to the lower end of the clear PVC filter tube 110 (e.g., by inserting it into the filter tube 110).

An attachment member 340 is used to attach the filter cone 104 to the filter tube 110, as seen in FIG. 3(C). In one example, a hose clamp 340 is used to attach the filter cone 104 to the filter tube 110. A flat head screwdriver may be used to tighten the screws of the hose clamp. Vinyl tape may be used to cover the hose clamp that secures the filter cone 104 to the filter tube 110.

Weights may be used to add weight to the interior of the filter cone 104, push the filter cone against the walls of the sand boil throat 120, and provide stability to the filter tube 110. In specific examples, a permeable granular material such as gravel 130 is used. Generally, sand or less permeable materials are not suitable weights for this purpose. A bulkhead fitting 345 may be used as a compacting tool to compact or densify the gravel 130 in the filter cone 104. FIG. 3(D) shows an example of a bulkhead fitting 345 coupled to the filter tube 110. A bucket with a lid may be used to store the gravel for transport. A hand scoop may be used to deposit the gravel 130 into the filter cone 104 from the open top 108.

In embodiments, the permeable granular material 130 is inserted to aid in holding the filter cone 104 in place. For example, the material 130 may include a high hydraulic conductivity material such as fine gravel with a median diameter (D50) of 0.285 in. (7.23 mm). The gravel or is placed in the filter cone 104 to add weight to the filter cone, provide friction between the filter cone 104 and the sand boil throat 120, and prevent the filter cone 104 from collapsing. Once all of the needed granular material is added, the filter cone 104 is pushed with the compacting tool into the sand boil throat 120 tightly to prevent sand from passing around the filter cone 104. The coarse material 130 in the filter cone 104 and the mesh of the filter cone 104 allow the water to flow freely out while providing some head loss relative to the tailwater head.

A seepage exit height adjustment tool 350 is used to adjust the height of the seepage exit on the filter tube 110 and set the hydraulic head of the seepage exits at a target exit height. FIG. 3(D) shows a close-up view of an exposed set of seepage exit slots 314 that allow the discharge of water and sand from the filter tube 110. In the embodiments shown, couplings such as no-hub couplings with clamps 350 are used to seal and block flow from the exit openings 314 on the filter tube 110 from those at the lowest height upward until the desired height of the unblocked exit openings 314 is achieved. The no-hub couplings 350 control or regulate the height of the water level that rises through the filter tube 110. These rubber couplings 350 seal the filter tube exit holes 314 and prevent leaking. The height of the water level can be adjusted by loosening the clamps of the couplings 350 and exposing the exit holes 314 or by tightening them to block sets of the exit holes 314. A nut driver (e.g., 5/16") may be used to tighten or loosen the screws of the no-hub couplings 350. Vinyl tape may be used to mark the locations of the no-hub couplings 350.

Heavy duty black tape may be used to cover the seepage exit holes 314 of the filter tube 110 as an alternative to the no-hub couplings 350 in case there are no additional couplings available. If tape is used to cover the holes 314 of the clear filter tube 110, a pocketknife can be used to remove the tape or pierce through the slots. The pocketknife may generally be used to cut tape, flexible tubing, etc. Flags can be placed on top of the filter tube 110 to add visibility to the filter tube. If no toolbox is available, the various tools and accessories may be stored in buckets with lids for transport.

In a specific embodiment, the sand boil filter kit includes a double-layer filter cone 104, a filter tube 110 with optionally a clear flexible tube 330 with holes, tape measure, no-hub couplings with clamps 350, hose clamps 340, a screwdriver, vinyl tape, fine gravel 130, a bulkhead fitting 345, one or more buckets with lid, a hand scoop, a nut driver, heavy duty black tape, a pocketknife, and flags.

Testing & Observations

The sand boil filter apparatus 100 has been tested successfully in a device capable of generating full-scale sand boils in a controlled environment. One person can install a sand boil filter apparatus in a sand boil with the required materials during a flood fighting event in case that there are no sandbags readily available. If used correctly, the sand boil filter apparatus can increase the head at the seepage exit of an active sand boil. The additional head that it can provide has been proven through laboratory experiments to be equivalent to the use of sandbags.

If there is no filter tube 110 extending through the apex 106 of the filter cone 104 into the sand boil throat 120, when the mesh size of the filter cone 104 is not big enough to let sand through, the sand boil throat 120 will clog. Clogging the throat causes a drastic increase in pressure under the filter cone 104, and the flow to drop abruptly. Extending the filter tube 110 into the sand boil throat 120 allows the water and sand to flow continuously from the throat 120 without clogging it. The seepage exit holes 314 on the filter tube 110 above the filter cone 104 can be plugged or unplugged as needed to control the pressure head through the filter tube 110. The excess head in the filter tube 110 is controlled by having its seepage exit holes 314 plugged above the water surface and then unplugging the seepage holes 314 from a certain height to let sand and water flow out. The filter tube 110 is installed with its lower portion extending at some depth below the apex 106 of the filter cone 104 inside the sand boil throat 120. Multiple inlet holes 320 may be drilled in the lower portion of the filter tube 110 to allow water and sand to enter the filter tube 110 when the tube extends more than 2 inches the apex 106. A hose clamp 340 or the like may be securely tightened at the filter cone apex 106 to keep the filter cone 104 and filter tube 110 together. The gravel 130 also helps to hold the filter tube 110 in the vertical position. Polymer filter cones 104 are used in experiments with the filter tubes 110. Filter tubes with an inner diameter smaller than ¾ in. (0.64 cm) may result in clogging with sand during testing.

Inserting the filter tube 110 into the sand boil throat 120 allows for a better control of the head at the seepage exit by forcing the water and sand to rise through the filter tube 110 and flow out from a determined height. The filter tube 110 can be adjusted in two ways. The first adjustment is the height of the lowest row of unplugged holes 314 above the water surface. This height determines the minimum excess head provided by the filter device 100. The second adjustment involves how deep the filter tube 110 extends below the apex 106 of the filter cone 104, e.g., 6 in. (15.2 cm) below the tip 106 of the filter cone 104, etc. This can be done by inserting a flexible tube 330 with holes 334 or adjusting the distance of the cone apex 106 from the end of the filter tube 110. This results in a variety of configurations.

Process for Assembling and Using Sand Boil Filter Apparatus

Figure 4:
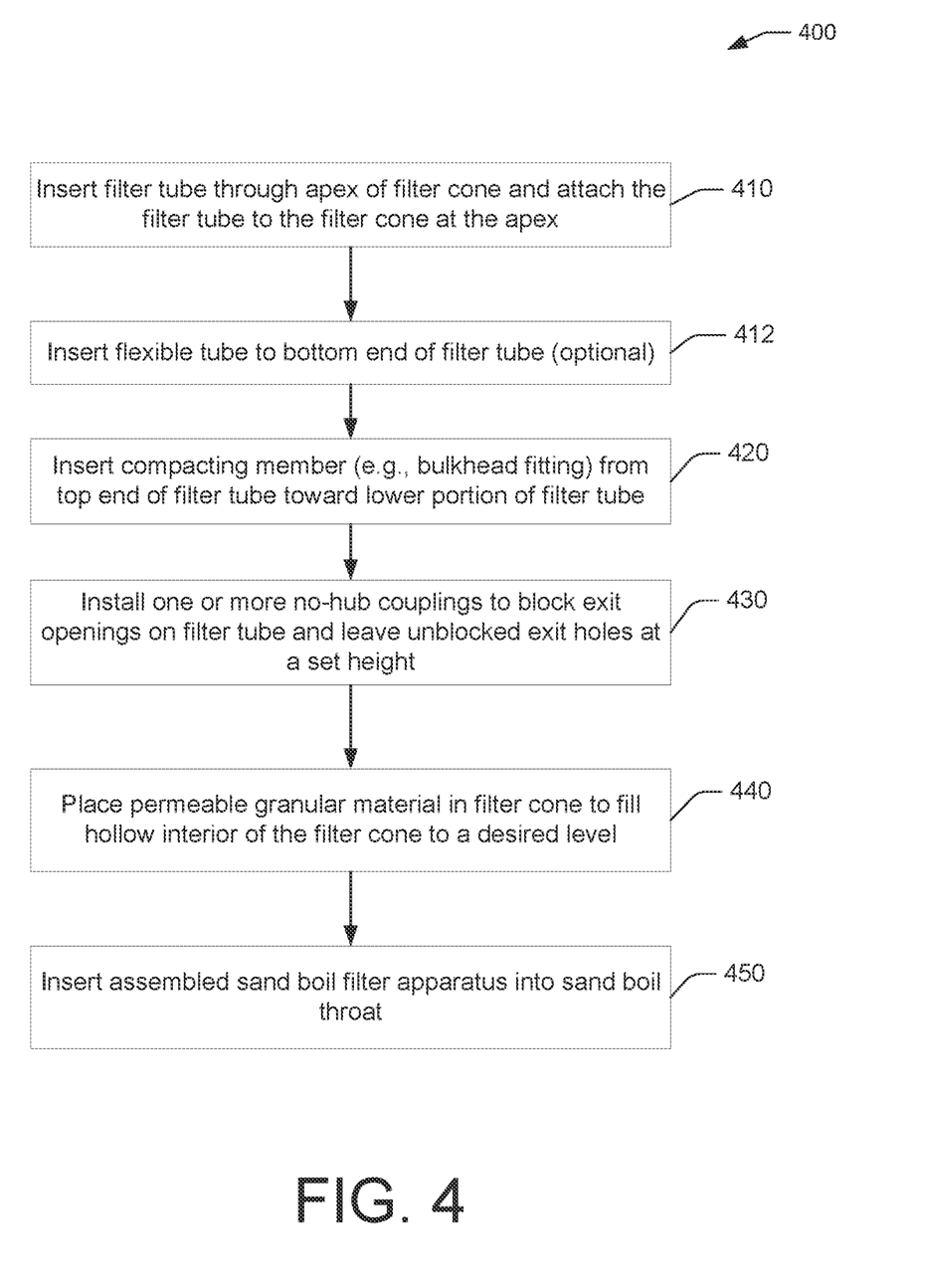
FIG. 4 is a flow diagram illustrating a process of assembling the sand boil filter apparatus.

FIG. 4 is a flow diagram illustrating a process of assembling the sand boil filter apparatus 100 and using it in the field to treat sand boils to prevent further erosion. The lightweight filter main components are a clear PVC filter tube 110, a filter cone 104, and couplings 350 such as rubber no-hub couplings.

In step 410, the filter tube 110 is inserted through the apex 106 of the filter cone 104 and the filter cone is attached and secured with a hose clamp 340 at the apex 106 to the clear PVC filter tube 110. To distinguish the bottom end of the filter tube 110 from the top end, one may note that the first set of slot openings 314 are closer from the top end (approximately 6 inches) than the first set of slot openings 314 from the bottom end (approximately 18 inches). Vinyl tape may be used to wrap the hose clamp 340. In a specific embodiment, the vertex or narrow end 106 of the filter cone 104 and the hose clamp 340 is at least 1 inch from the lower end of the filter tube 110, but not more than 2 inches. In step 412, a clear, flexible tube 330 with holes 334 may be inserted at or otherwise connected to the bottom end of the filter tube 110 (optional). This flexible tube 330 can allow the sand boil filter apparatus 100 to be extended deeper in the ground. However, it requires attention from the user as this flexible part could bend by accident and not let any flow through it. The flexible tube 330 can be cut with the pocketknife if it needs to be shorter or removed, if necessary.

In step 420, a compacting tool such as a bulkhead fitting 345 is inserted from the top end of the filter tube 110. If there are no-hub couplings 350 already attached to the filter tube 110, they will need to be removed before installing the bulkhead fitting. The bulkhead fitting 345 is used as a tool to push and compact gravel 130 or other permeable granular materials.

In step 430, one or more no-hub couplings 350 are installed to block the seepage exit holes 314 on the filter tube 110 as desired and leave unblocked exit holes at a set height. The clamps of the couplings 350 can be tightened with a nut driver. Tape can be used beforehand to mark the positions of where the couplings need to be along the filter tube 110. The couplings 350 are used to cover and seal the seepage exit slots 314 completely.

In step 440, the user may use a hand scoop to add the weights in the form of a permeable granular material such as fine gravel 130 to the filter cone 104 from the open top 108. The gravel 130 should be added evenly around the clear PVC filter tube 110 and the filter tube 110 should be kept as straight and vertical as possible. The user may fill the filter cone 104 with the gravel 130 to approximately half of the height of the filter cone 104 or more. More gravel may be required for a sand boil throat 120 that has an opening larger than 6 inches. The bulkhead fitting 345 stays exposed above the gravel 130. The user may tap around the filter cone 104 to distribute evenly the weight of the gravel 130. The user may verify that the outside of the filter cone 104 has as few wrinkles as possible before compacting the gravel 130 with the bulkhead fitting 345.

Figure 5:
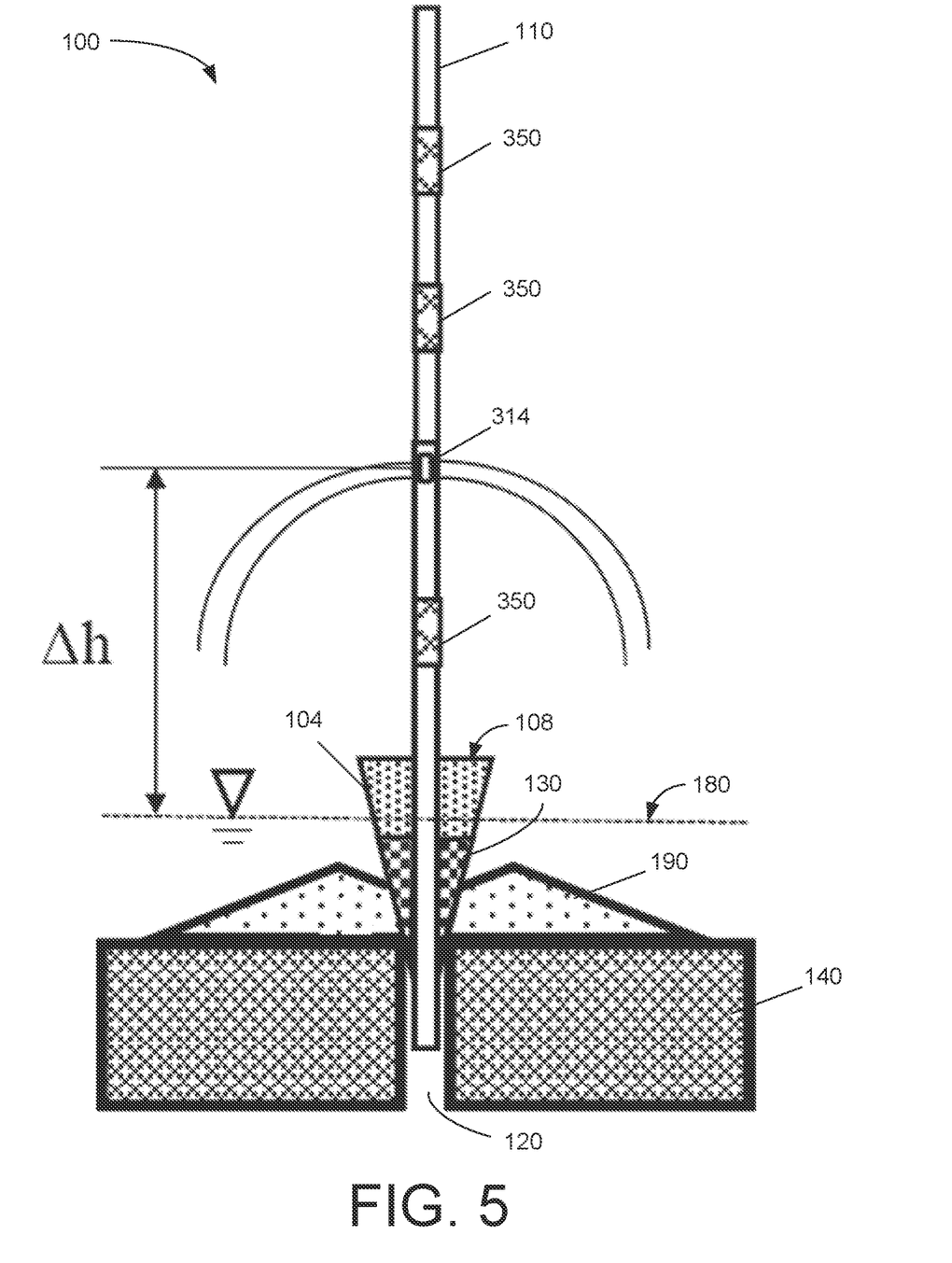
FIG. 5 schematically illustrates insertion of the assembled sand boil filter apparatus into the sand boil throat with the height of exposed exit slots measured from the water level on the sand boil.

In step 450, the assembled sand boil filter apparatus 100 is inserted into the sand boil throat 120. It is very important to be aware of the first set of exposed slots 314 (at the lowest height) from which water and sand will exit. The initial height of exposed slots may be set at approximately 1.5 ft.-2 ft. (12 in.-24 in.) (e.g., "approximately" may mean an acceptable deviation of less than about 10%). As seen in FIG. 5, this height or head difference ($\Delta h$) is measured with a tape measure from the water level 180 on the sand boil to the first set of exposed slots 314. This head is a starting point with a head difference that is not too excessive that could quickly clog the sand boil. It can be increased and decreased later in the next steps.

Figure 6:
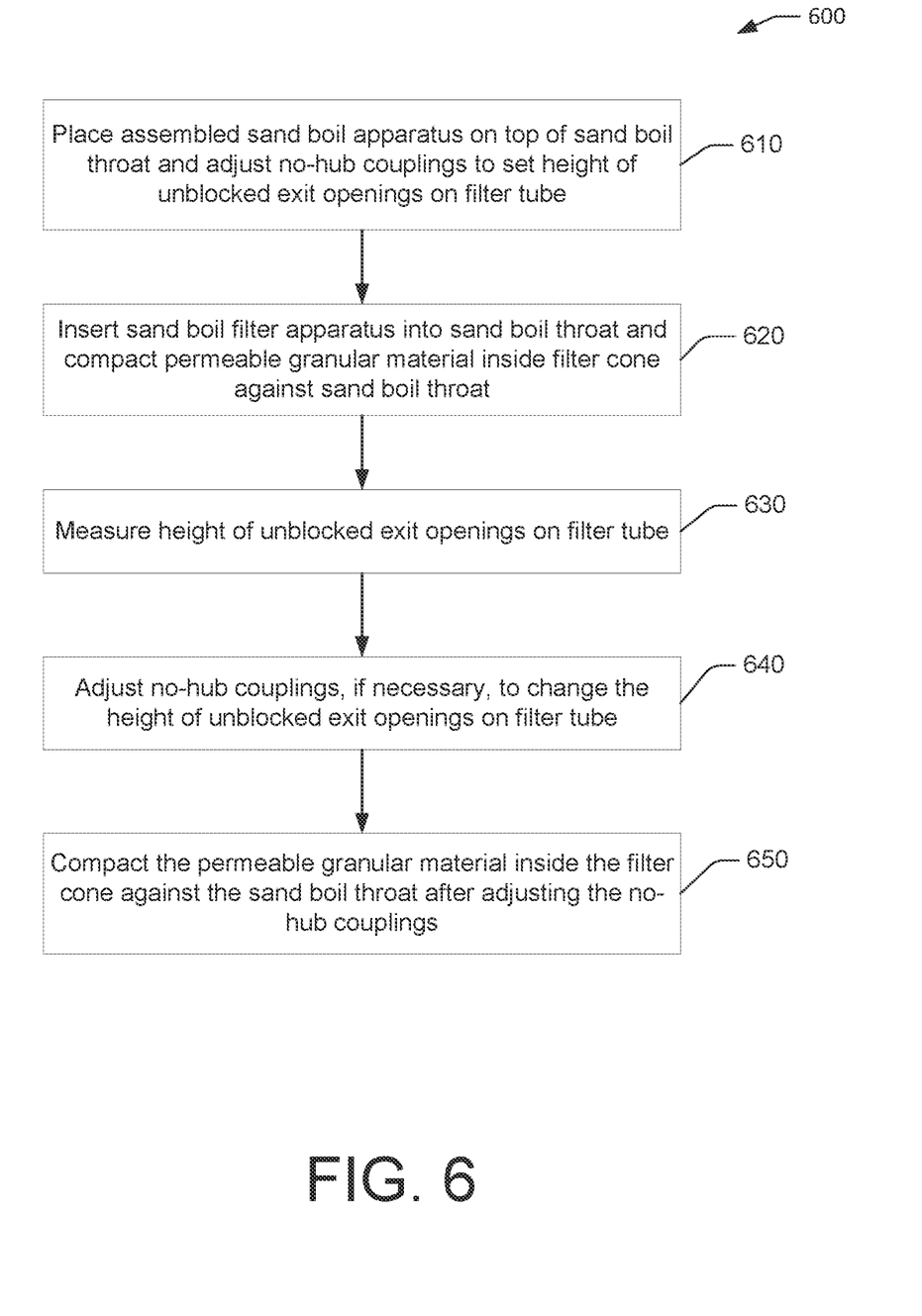
FIG. 6 is a flow diagram illustrating a process of using the assembled sand boil filter apparatus in the field to treat sand boils to prevent further erosion.

FIG. 6 is a flow diagram illustrating a process of using the assembled sand boil filter apparatus 100 in the field to treat sand boils to prevent further erosion. In step 610, the assembled sand boil filter apparatus 100 can be placed right on top of the sand boil throat 120 without pushing it into the throat 120. The tape measure can be used to estimate how deep the filter apparatus 100 will be when pushed. The user may adjust the couplings 350 to set up the initial height of the exposed exit slots 314 before pushing the filter apparatus 100 into the sand boil throat 120. The initial height setting may not be exact, but it gives the user an idea of where water will come out before inserting the filter apparatus.

In step 620, once the first set of exposed holes has been decided and set, the user may insert the sand boil filter apparatus 100 into the sand boil throat 120 and use the bulkhead fitting 345 to push down and compact the gravel 130. The user may try to ensure that pushing down the gravel 130 creates a good "seal" around the filter cone 104, as this will ensure that water and sand are forced to rise through the filter tube 110 instead of through or around the filter cone 104.

In step 630, with the sand boil filter apparatus 100 inserted, the user may take a measurement of the height of the first set of exposed slots 314. If it is not the set initial height (e.g., approximately 1.5 ft.-2 ft.), the user may use the nut driver to adjust the couplings 350 and make the necessary corrections (step 640). For example, a height of approximately 2 feet for the exposed slots 314 is equivalent to increasing the pool level two feet with sandbags. If the seepage exit slots 314 are evenly spaced every 6 inches in height, the water head can be adjusted by 6 inches at a time. The spacing can be changed depending on the desired adjustment flexibility and increment.

When the couplings 350 are moved, the gravel 130 may need to be compacted to "seal" around the filter cone 104 again (step 650). The user should be aware of possible "blowouts" around the filter cone 104 when it is not sealing properly. If the sand boil filter apparatus 100 is properly installed and works correctly, the eroded material coming out from the sand boil will get blocked by the filter cone 104 and the water with the sediments will rise in the filter tube 110 and come out from the first set of exposed exit slots 314. The user may use his or her judgement as to whether to increase or decrease the height of the exposed exit slots 314 depending on the condition of the water flowing out from the filter tube 110. The goal is to control the sand boil, not to plug it. It is normal if sand coming out from the sand boil accumulates inside the filter cone 104 with the gravel 130.

Once the water comes out clear, the erosion has been controlled. The sand boil filter apparatus 100 can be left in place until it is necessary to remove or until sandbags can be brought to site. After its use, the sand boil filter apparatus 100 can be washed and reused. The filter cone 104 or any other of the components can be replaced, if necessary.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A sand boil filter apparatus comprising:
a filter cone including an inner cone mesh and an outer cone mesh, the inner cone mesh having a finer mesh than the outer cone mesh, the filter cone having a hollow interior with an open apex oriented downwardly and an open base disposed above the open apex;
a filter tube extending through the hollow interior of the filter cone, the filter tube including a lower portion disposed below the open apex of the filter cone, the filter tube including an upper portion disposed above the open base of the filter cone, the upper portion having a plurality of sets of exit openings which are spaced along a length of the upper portion to provide different possible exit heights for the plurality of sets of exit openings, each set including one or more exit openings disposed at an exit height of the filter tube;
weights disposed inside the hollow interior of the filter cone and surrounding a portion of the filter tube disposed inside the hollow interior of the filter cone; and
an exit height adjustment tool to block all of the exit openings disposed below a set of unblocked exit openings selected to provide a corresponding exit height.

2. The sand boil filter apparatus of claim 1, wherein the inner cone mesh has an average hole size of 0.003 inches (0.076 millimeters) in diameter.

3. The sand boil filter apparatus of claim 1, wherein mesh openings in the outer cone mesh are two times larger to an order of magnitude larger than mesh openings in the inner cone mesh.

4. The sand boil filter apparatus of claim 1, wherein the filter tube includes a plurality of ports disposed along the lower portion to permit entry of water and particles into the filter tube.

5. The sand boil filter apparatus of claim 1, wherein the exit height adjustment tool comprises a no-hub coupling for sealing each set of the exit openings disposed below the set of unblocked exit openings selected to provide the corresponding exit heights.

6. The sand boil filter apparatus of claim 1, further comprising:
a flexible tube connected to a lower end of the lower portion of the filter tube, the flexible tube having a plurality of opening to permit entry of water and particles into the flexible tube.

7. The sand boil filter apparatus of claim 1, further comprising:
an attachment member to attach the filter cone and the filter tube at the open apex of the filter cone.

8. The sand boil filter apparatus of claim 1, further comprising:
a compacting tool coupled to the filter tube and disposed in the hollow interior of the filter cone above the weights.

9. A sand boil filter apparatus for controlling a sand boil, the sand boil filter apparatus comprising:
a filter cone having a hollow interior with an open apex oriented downwardly and an open base disposed above the open apex, the filter cone including means for letting water through and blocking particles from passing therethrough;
a filter tube extending through the hollow interior of the filter cone, the filter tube including a lower portion disposed below the open apex of the filter cone, the filter tube including an upper portion disposed above the open base of the filter cone, the upper portion having a plurality of sets of exit openings which are spaced along a length of the upper portion to provide different possible exit heights for the plurality of sets of exit openings, each set including one or more exit openings disposed at an exit height of the filter tube;
a permeable granular material disposed inside the hollow interior of the filter cone and surrounding a portion of the filter tube disposed inside the hollow interior of the filter cone; and
means for blocking all of the exit openings disposed below a set of unblocked exit openings selected to provide a corresponding exit height.

10. The sand boil filter apparatus of claim 9, wherein the filter cone includes an inner cone mesh and an outer cone mesh, mesh openings in the outer cone mesh being two times larger to an order of magnitude larger than mesh openings in the inner cone mesh.

11. The sand boil filter apparatus of claim 9, further comprising:
a flexible tube connected to a lower end of the lower portion of the filter tube, the flexible tube having a plurality of opening to permit entry of water and particles into the flexible tube.

12. The sand boil filter apparatus of claim 9, further comprising:
means for attaching the filter cone and the filter tube at the open apex of the filter cone.

13. The sand boil filter apparatus of claim 9, further comprising:
means for compacting the permeable granular material inside the hollow interior of the filter cone.

14. A method of controlling a sand boil having a sand boil throat, the method comprising:
positioning a filter cone having a hollow interior with an open apex oriented downwardly and an open base disposed above the open apex, the filter cone including an inner cone mesh and an outer cone mesh, the inner cone mesh having a finer mesh than the outer cone mesh to let water through and block particles from passing therethrough;
inserting a filter tube through the hollow interior of the filter cone, the filter tube including a lower portion disposed below the open apex of the filter cone, the filter tube including an upper portion disposed above the open base of the filter cone, the upper portion having a plurality of sets of exit openings which are spaced along a length of the upper portion to provide different possible exit heights for the plurality of sets of exit openings, each set including one or more exit openings disposed at an exit height of the filter tube;
placing a permeable granular material inside the hollow interior of the filter cone to surround a portion of the filter tube disposed inside the hollow interior of the filter cone; and
blocking all of the exit openings disposed below a lowest set of unblocked exit openings selected to provide a corresponding exit height.

15. The method of claim 14, further comprising:
attaching the filter cone and the filter tube at the open apex of the filter cone.

16. The method of claim 14, further comprising:
connecting a flexible tube to a lower end of the lower portion of the filter tube, the flexible tube having a plurality of opening to permit entry of water and particles into the flexible tube.

17. The method of claim 14, further comprising:
inserting the lower portion of the filter tube into the sand boil throat and inserting the filter cone partially into the sand boil throat; and
compacting the permeable granular material inside the hollow interior of the filter cone.

18. The method of claim 17, further comprising:
measuring an exit height of the lowest set of unblocked exit openings; and
if the exit height is not at a target exit height, performing at least one of unblocking one or more sets of the exit openings or blocking one or more sets of the exit openings, to provide a different lowest set of unblocked exit openings corresponding to the target exit height.

19. The method of claim 18, further comprising:
compacting the permeable granular material inside the hollow interior of the filter cone after performing the at least one of unblocking one or more sets of the exit openings or blocking one or more sets of the exit openings, to provide the different lowest set of unblocked exit openings corresponding to the target exit height.

20. The method of claim 18,
wherein the target exit height is initially approximately 1.5 to 2 feet measured from a water level on the sand boil to the lowest set of unblocked exit openings.

* * * * *